April 23, 1957 K. MOHR 2,790,152
SWIVELED CABLE CONNECTOR
Filed May 28, 1953
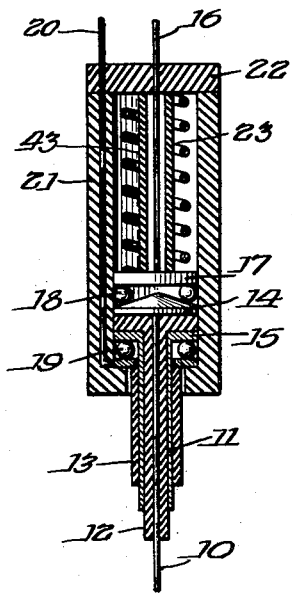
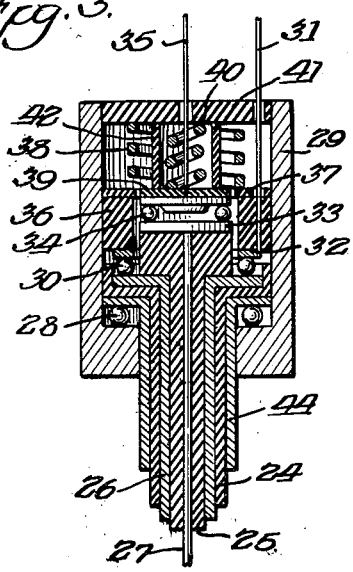
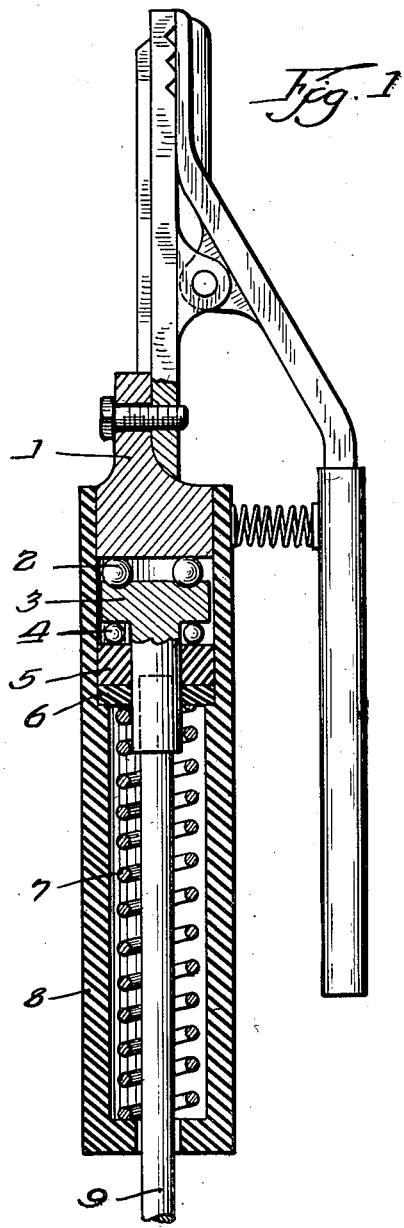
Inventor:
Karl Mohr.

2,790,152
% Patented Apr. 23, 1957

2,790,152
SWIVELED CABLE CONNECTOR

Karl Mohr, Aschaffenburg, Germany

Application May 28, 1953, Serial No. 358,009

1 Claim. (Cl. 339—8)

This invention is concerned with a swiveled or articulated cable connector for single or multiple phase current conductors for all types of electrical appliances.

Conventional connections for electrical cables of all types are usually rigid. Due to this fact, they render work cumbersome or difficult, as twisting of the cables during use is frequently inevitable. Such twisting causes kinks in the cable, thereby damaging the insulation in the course of time and possibly even buckling or rupturing the current supply. The twisting of cables causes premature wear and requires frequent repair.

The present invention avoids this disadvantage by providing a swiveled cable connector. In accordance with the invention, the electrical connection between the terminal conductors is effected through interposed anti-friction bodies, for example, bearing members, including spherical, cylindrical, barreled or conical bodies, which are held in position by resilient pressure exerted, for example, by spring means.

The new swiveled cable connector is applicable for single-phase and multiple-phase current supply.

The invention will be explained in greater detail with reference to the accompanying drawing wherein Fig. 1 shows a sectional view of an example of a single-conductor swiveled cable connector for a welding electrode holder;

Fig. 2 shows a sectional view of a swiveled two-conductor connector; and

Fig. 3 shows a sectional view of a three-conductor connector.

Referring to the embodiment illustrated in Fig. 1, numeral 9 indicates a current supply conductor which may extend from a suitable cable and terminates in a terminal member or socket having an enlarged platelike head 3. This terminal member is mounted for rotation relative to a bearing sleeve 5 and relative to the base or terminal member 1 by means of ball bearings 2 and 4. The base or terminal member 1 carries a suitable holder for a welding electrode as shown. The balls 2 interposed between terminal members 1 and the head 3 serve to convey the current. A spring 7 is provided for exerting axial pressure on an insulating washer 6 and therewith on the bearing sleeve 5 which in turn exerts pressure on the ball bearings 4, thus holding the head 3 under axial thrust against the ball bearings 2. The spring 7 is disposed in the jacket or handle portion 8 which is preferably made of non-breakable insulating material and forms a casing for the parts described. The outer end of the spring rests against the end wall of such casing.

The raceways on the terminal member 1 and on the head 3 are profiled to correspond to the radius of the balls 2. The continuous thrust of the spring 7 maintains in reliable manner the current supply from the conductor 9 to the welding electrode that may be connected with the holder extending from the base or terminal member 1. Proper flow of current is thus insured even at very low voltages.

The conducting parts 1, 2 and 3 are insulated from the casing 8 by the insulating washer 6. The spring 7 accordingly does not carry current; the transmission of current taking place solely at the forward or inner terminal portion of the handle. This avoids overheating of the handle 8 even during continuous welding operations with powerful electrodes. The conductor 9 extending from a cable is freely rotatable and twisting of the corresponding cable is thus prevented. The insulating washer also operates as a spacer member to insure the salient swivel and thrust parts against undesired displacement.

In the embodiment shown in Fig. 2, it is assumed that the current is supplied by a cable having two conductors which are rotatably anchored in insulated manner. The incoming conductors 10 and 11 extending from the cable are separated from each other by insulating layers 12 and 13 and terminate respectively in head portions 14 and 15. The current from the conductor 10 to the corresponding relatively stationary conductor 16 is transmitted over balls 18 which are interposed between head portions 14 and 17. Similarly, balls 19 are interposed between, and electrically connect, conductor 11 and the relatively stationary conductor 20 cooperating therewith. The conductors 10 and 11 are thus swiveled for free rotation. In the embodiment shown, conductor 20 is embedded in the insulating casing 21 which corresponds to the casing 8 in Fig. 1. A spring 23, interposed between the end plate 22 of this jacket and the head 17, continuously insures reliable electrical contact between the swiveled or rotatable incoming and the relatively stationary outgoing conductors through the medium of balls 18 and 19. Conductor 16 is surrounded by an insulating sleeve 43 which also serves as a spacer member to insure the salient swivel and thrust parts against undesired displacement. Incoming conductors 10 and 11 are by suitable and desired means, for example, by clamping or soldering connected with respectively cooperating conductors of a cable or the like (not shown); outgoing conductors 20 and 16 are in similar manner connected with respectively cooperating conductors of a connecting cable or a device (not shown) to which current is to be supplied.

Fig. 3 illustrates a similar swiveled three-conductor arrangement, for example, for three-phase current supply with grounded conductor. Although return wires are not required with three-phase current, yet a grounded conductor is desired because the current-consuming units may not be entirely uniformly distributed.

In Fig. 3, there is provided a tubular metallic member 44 forming part of a rotatable cable connector comprising a plurality of conductors. The member 44 may serve as the grounded or zero conductor. Inside of the member 24 are disposed conductors 26 and 27, which may extend from a cable; insulating layers 24 and 25 are disposed between such conductors. Conductors 26, 27 and 44 are connected in suitable manner, for example, by soldering or clamping, with respectively cooperating conductors of a cable (not shown). Contact with the grounded conductor 44 is effected through balls 28 and the enclosing metallic non-rotatable casing 29 which corresponds to the casings 8 and 21 of Figs. 1 and 2. The conductor 44 need not be insulated to the outside because it serves with the casing 29 as a zero conductor. However, if current is to be conducted over conductor 44 and the casing 29, both parts must be insulated to the outside. Current conductor 26 is electrically connected with the associated relatively stationary conductor 31 by way of interposed balls 30 and a metal ring or head 32, while conductor 27 is connected with the relatively stationary conductor 35 by way of a plate-shaped head 33 and balls 34. The individual current paths are insulated from each other by a spacer ring 36. Electrical continuity is insured by spring pressure; ball bearings 30 and 28 receive thrust from a spring 38 acting on an annular washer 37, while ball bearing 34 is acted upon by a spring 40 through a washer 39. Both springs are supported by the end wall 41 of the casing or housing 29. An insulating sleeve 42, surrounding conductor 35, also serves as a spacer member to insure the positions of the salient parts in a similar manner as in the case of members 43 and 6 discussed in connection with Figs. 1 and 2. If the conductor 44 and casing 29 are not used as zero conductors but as third conductors in the transmission of three-phase current, the current will be transmitted by way of the balls 28. An outgoing conductor analogous to 35 and 31 will be provided for the casing 29. In such case, the parts 44 and 29 will be suitably insulated to the outside.

Changes may be made within the scope and spirit of the appended claim.

I claim:

A cable connector for articulately joining incoming with outgoing conductor means, comprising a casing, said incoming conductor means comprising a plurality of rotatably journaled incoming conductors including a centrally axially extending incoming conductor and at least one tubular incoming conductor disposed concentric thereto and insulated therefrom, said outgoing conductor means comprising conductors for respectively cooperating with said incoming conductors, a conductive rotatably disposed raceway carried by each rotatable incoming conductor within said casing, a complementary angularly relatively stationary conductive raceway carried by each outgoing conductor for cooperation with a rotatable raceway carried by a corresponding incoming conductor, conductive rolling bodies disposed respectively between each rotatable raceway and its complementary angularly relatively stationary raceway and forming a ball bearing therewith, spacer means extending between one of said angularly relatively stationary raceways and an end wall of said casing for holding all said raceways against axial displacement, and axially extending compression spring means disposed between the identical end wall of said casing and one of said raceways, the ball bearings formed by said raceways and respectively cooperating rolling bodies being disposed axially successively and the tracks of said rolling bodies extending along substantially identical diameters, said spring means exerting axial pressure on said one raceway which is propagated over the intervening rolling bodies to the corresponding complementary raceway so as to hold said rolling bodies in operating position.

References Cited in the file of this patent

UNITED STATES PATENTS

| 1,973,234 | Tsavaris | Sept. 11, 1934 |
| 2,098,304 | Nakich | Nov. 9, 1937 |
| 2,433,938 | Varner | Jan. 6, 1948 |
| 2,459,032 | Korth | Jan. 11, 1949 |

FOREIGN PATENTS

| 22,138, | Great Britain | of 1911 |
| 599,831 | Great Britain | Mar. 22, 1948 |